United States Patent Office 3,392,718
Patented July 16, 1968

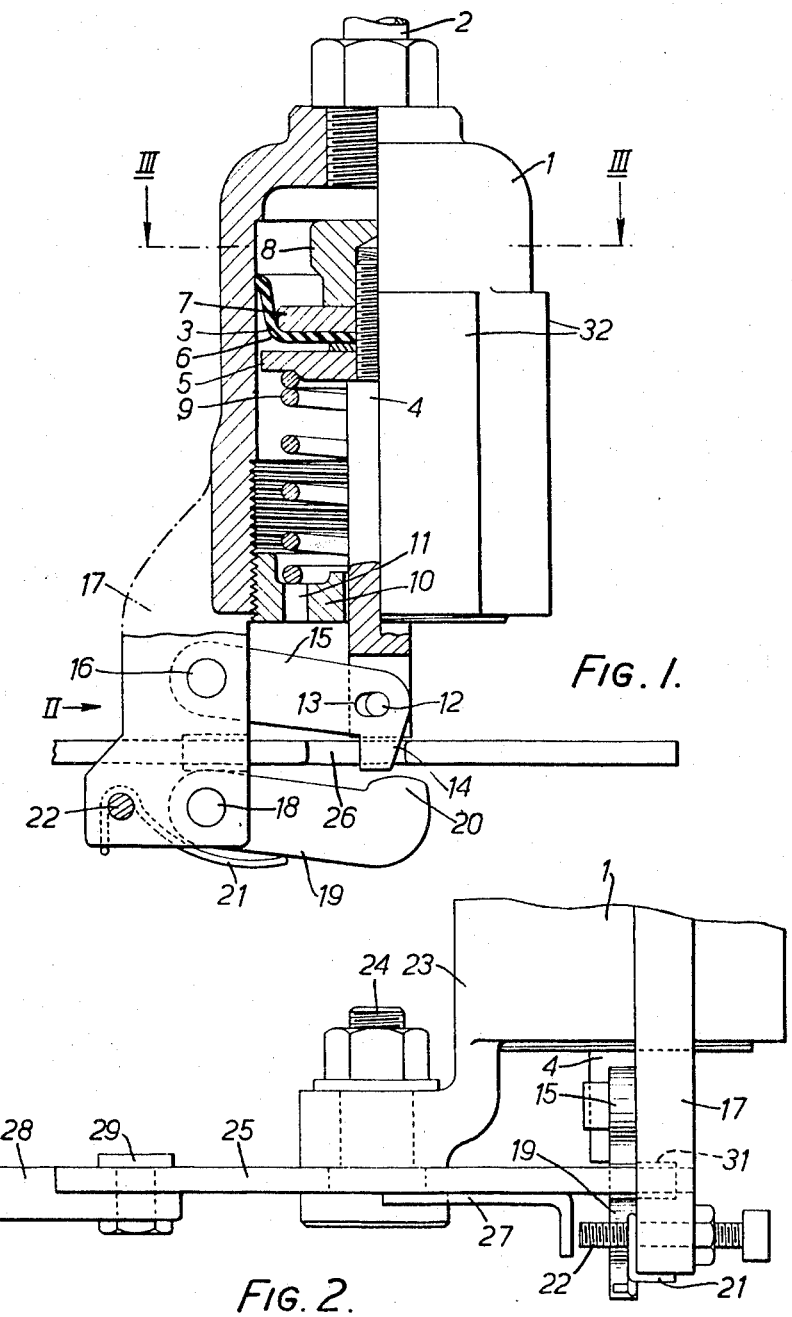

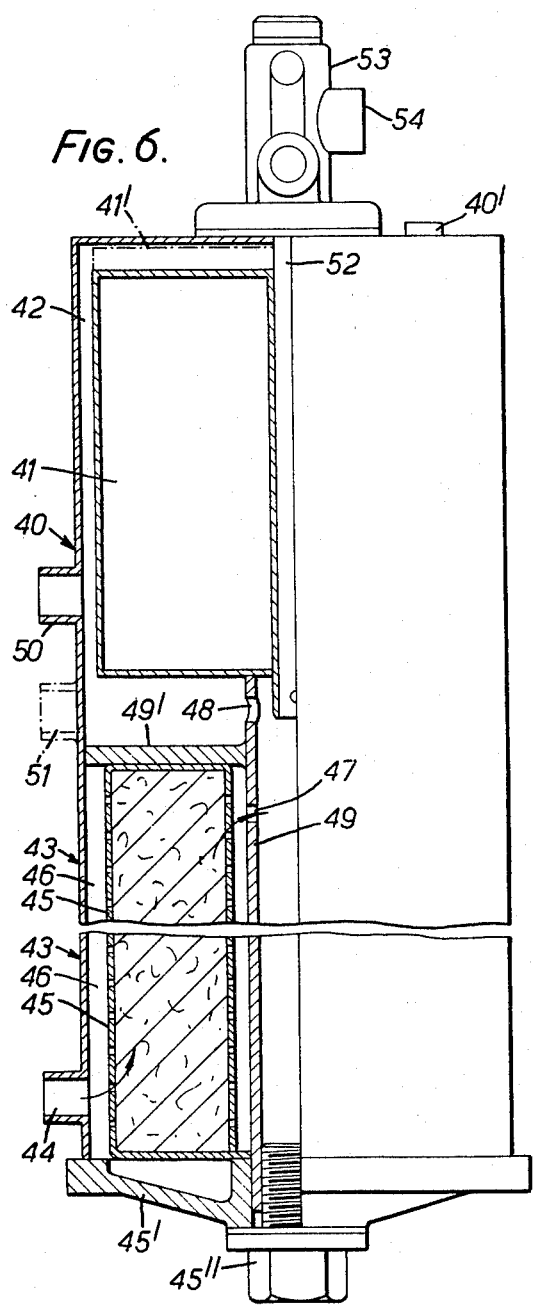

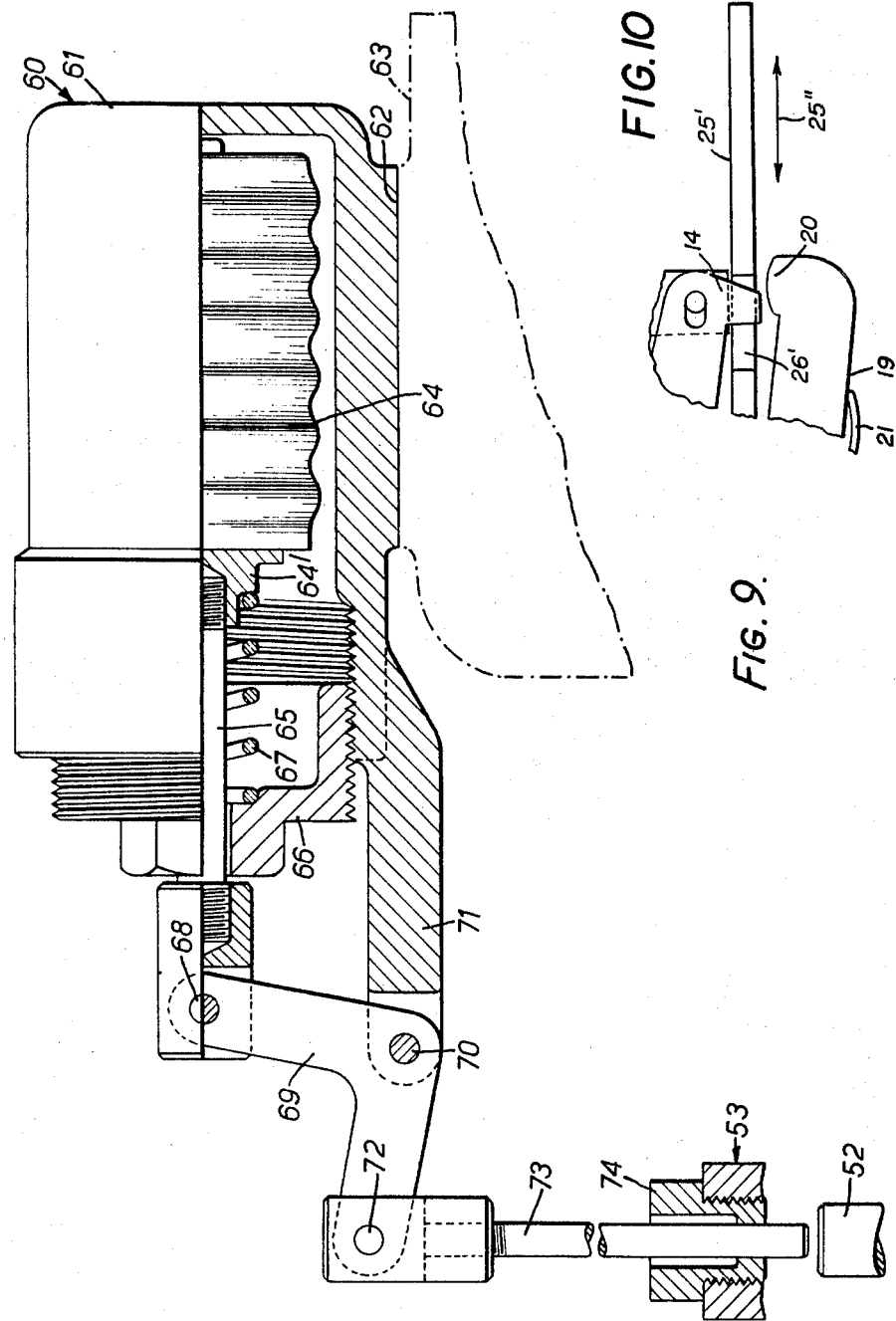

3,392,718
ENGINE CONTROL APPARATUS
Philip K. Saunders, Saunders Lane, R.F.D. I, Ridgefield, Conn. 06877, and Charles Denis Bliss Williams, Colemore Lane, Kingwood Common, Oxfordshire, Henley-on-Thames, England
Filed Aug. 17, 1966, Ser. No. 572,985
Claims priority, application Great Britain, Aug. 27, 1965, 36,889/65
12 Claims. (Cl. 123—198)

ABSTRACT OF THE DISCLOSURE

The fuel injection pump of a diesel engine is controlled to the zero stroke or "stop" position by a strong spring, which spring pressure is overcome by a servo system having a control valve movable by a float in the fuel supply line, so that the engine will be stopped upon low-fuel, entirely by the hydraulic force of the lubricating pressure and before air can enter into the fuel pump system; additionally, a thermostat may be connected to control the servo-valve to likewise stop the engine upon overheating.

---

The invention concerns improvements relating to control apparatus for fuel injection type internal combustion engines and more particularly to stop diesel engines automatically under certain emergency conditions.

According to the invention the engine control apparatus is actuated by engine lubricating oil pressure. The engine is stopped upon failure of fuel supply, which is sensed by a sensing means, such as a float. The float operates a valve in the engine oil pressure supply; the engine oil pressure then operates a stopping device connected to the fuel injection pump of the engine to set the stroke of the pump to zero, thus cutting the supply of fuel to the engine.

In a preferred case the sensing means comprises a float unit in the fuel supply of a diesel engine upstream of the injector pump and so arranged as to operate the valve to in turn stop the engine prior to the fuel supply being exhausted to prevent air entering the fuel injection system.

The valve means may comprise a piston valve and the float acts directly on the valve piston normally at a high level to maintain the engine oil pressure in communication with the stopping device, but at a low level to cut off the actuating pressure to the stopping device and put the same in communication with exhaust, e.g. to the engine oil sump.

The sensing means may further include a temperature sensitive unit arranged to operate the valve means to stop the engine upon sensing an unduly high engine temperature, e.g. of the cylinder head or block or of an engine coolant or the engine oil.

The stopping device may comprise a piston or diaphragm means displaced under the normal running engine oil actuating pressure against a spring force to lock an engine control member in engine running position, the spring force acting on the piston or diaphragm means upon the fall in said actuating pressure to release said control member for automatic movement to a position to stop the engine.

An embodiment of apparatus in accordance with the invention is hereinafter described by way of example with reference to the accompanying drawings wherein:

FIG. 1 is an axial part sectional view of one form of the stopping device,

FIG. 2 is a partial view of such device as seen in the direction II of FIG. 1,

Figure 3:
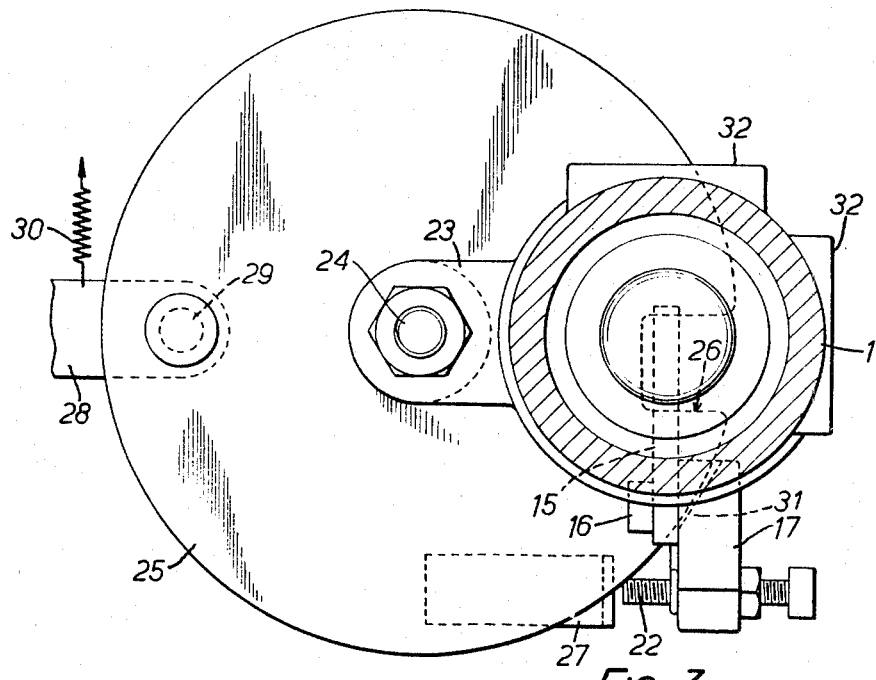
Figure 4:
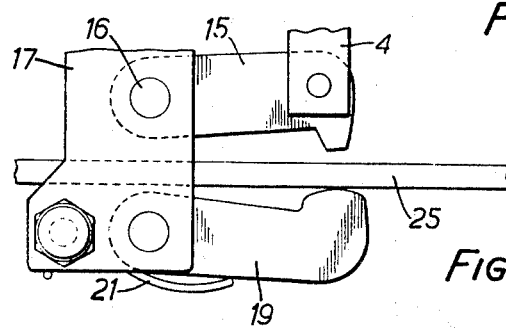
Figure 5:
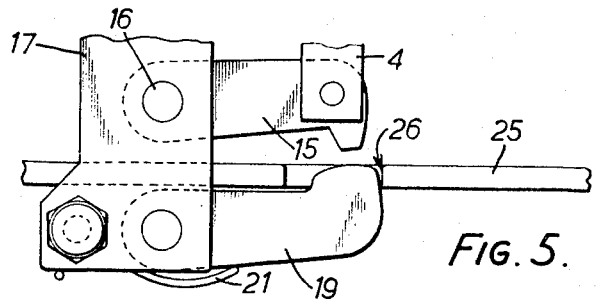
Figure 8:
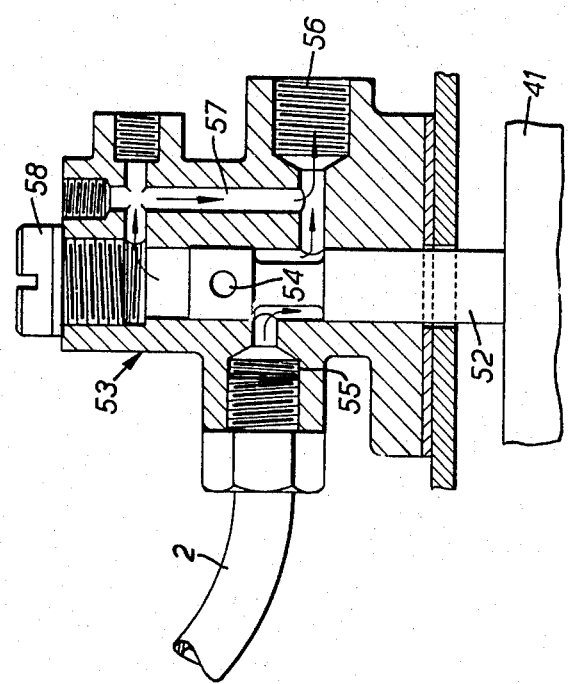
Figure 7:
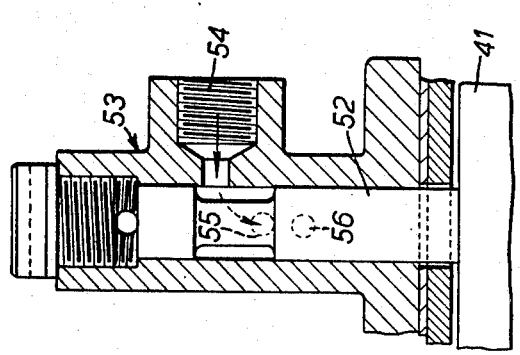

FIG. 3 is a transverse sectional view as seen on the line III—III of FIG. 1 with certain parts omitted, FIGS. 4 and 5 illustrate trigger positions of the device with the engine stopped and with the device re-set for engine starting, respectively, FIG. 6 illustrates a float unit surmounting a fuel filter unit and carrying a piston valve means operated by the float to actuate the stopping device, FIG. 7 is an enlarged sectional view of the valve means with the float at a normal high engine running level, FIG. 8 is another view of the valve means and with the float at a low level wherefor the engine is stopped, and FIG. 9 illustrates a temperature sensitive unit also arranged to operate the valve means; and FIG. 10 is a partial view similar to FIG. 1 of another embodiment of release mechanism.

Firstly referring to FIGS. 1 to 5, the stopping device comprises a cylinder 1 connected at one end via a piping connection 2 to the engine lubricating oil system as later explained. A piston means 3 operated within the cylinder is carried by a piston rod 4 and comprises a rear disc 5, a seal 6, a front disc 7, and a retaining nut 8. A spring 9 acts between the rear disc 5 and a nut 10 which is adjustable axially of the cylinder by tool locating holes 11 to adjust the spring force. The piston rod passes axially through the nut 10 and carries a pin 12 engaging in an opening 13 towards one hooked end 14 of a first trigger 15 which is pivotally mounted towards its other end on a bolt 16 located in a bracket 17 depending from the outside of the cylinder 1. The bracket 17 also locates a bolt 18 pivotally carrying a second trigger 19 presenting a hooked end 20 directly below that of the first trigger and biased theretowards by a spring 21 located on an adjustable screw stop 22 carried by the bracket.

Another bracket 23 depending from the outside of the cylinder 1 locates a bolt 24 by which an engine control member in the form of a disc 25 is rotatably mounted. The disc presents at its periphery a slot 26 with which the triggers co-operate in an engine running locked position of the disc. The disc carries at its underside a lug 27 to engage against the stop 22 in such locked position of disc. An arm 28 fixed to the disc by a bolt 29 extends radially outwards from the disc and is acted upon by a spring as indicated at 30 e.g. anchored at one end to the engine, tending to urge the disc to rotate in a clockwise direction as seen in FIG. 3 from the locked position to a position to automatically stop the engine. The bracket 17 presents a groove 31 to accommodate the disc edge. The cylinder may be secured to the engine at one or other of the two flat faces 32 in any desired attitude. A diaphragm means could be used instead of the piston means 3.

For operation, the spring 9 is pre-set so that when engine oil pressure exceeds a pre-determined low figure (say 10 lbs./sq. in.) it will act to displace or depress the piston means 3 against the spring force. Thus, with the engine stopped the first trigger 15 will be withdrawn from locking engagement with the disc slot, and the disc will be rotated to the engine stopping position; the triggers are then positioned as in FIG. 4. To allow re-starting of the engine, the disc has to be re-set to the locked position by rotating same in an anti-clockwise direction as seen in FIG. 3 against the force of the spring 30, until the disc lug 27 engages against the stop 22. This may be done by acting on the disc arm 28 manually or automatically e.g. by a solenoid means (not shown) which may be in circuit with an electrical engine starter. The second trigger 19 is urged by the spring 21 against the underface of the disc and so will become lockingly engaged in the disc slot as in FIG. 5, thus preventing the disc from turning back under the action of the spring 30. The engine is therefore free to start and when it does so, unless there is some defect, the actuating oil pressure will depress the piston means 3 and thus the first trigger 15 into the disc slot. This will simultaneously push the second trigger 19 out of engagement with the disc slot. The arrangement is such that the disc will then be rotated slightly by the spring 30 in a clockwise direction as seen in FIG. 3 until as seen in FIG. 1 the trailing disc slot edge abuts against the first trigger, and the second trigger cannot re-engage in the slot upon withdrawal of the first trigger.

The engine will now continue to run until stopped intentionally or until the actuating oil pressure falls below the pre-determined figure. The first trigger will then be withdrawn from the disc slot to release the disc for automatic movement to the engine stopping position. Such movement of the disc and disc arm 28 acts to stop the engine in any desired manner; and particularly, in a diesel engine, controls the injection pumps to zero stroke, that is to effectively shut off the injector pump. It may act indirectly where the engine is too large, that is where its stopping mechanism requires additional force for actuation, to trigger a still more powerful mechanism to stop the engine. For instance, a powerful spring acting to stop the engine can be prevented from so doing by a solenoid means or a compressed air means controlled by a switch or valve to be actuated by arm 28 or a cam on the disc. Vice versa, such spring could act to maintain the engine running, and the solenoid or compressed air means be actuated to counteract the spring to stop the engine. Where an engine has an independent starting lube oil pump, as distinct from an engine driven pump, such pressure oil means could be used instead of said compressed air means.

Instead of a disc, the engine control member may be in the form of a reciprocable rod 25', see arrow 25" (FIG. 10) and the triggers co-operate with catch means 26 on the rod in the engine running locked position of the rod.

The actuating oil pressure applied to cylinder 1 is reduced below the pre-determined level not only by failure of oil supply but in accordance with the invention, by a valve which is operated by a fuel level sensing means.

Thus referring to FIGS. 6 to 8, a float unit 40 is located in the fuel supply of a fuel injection engine upstream of the injector pump. The float unit comprises a float 41 located in a fuel float chamber 42 with air vent 40' and surmounting and downstream of a fuel filter unit 43. The fuel enters the filter unit at 44, passes through a replaceable filter cartridge 45 in the settlement chamber 46, and thence through orifices 47 and 48 in a central tube 49 into the float chamber, and out of the float chamber at 50 to the injector pump. The cartridge is located by a lower end cap 45' secured by a nut 45" screwed into the lower end of the tube 49. The tube is welded to the annular web 49' dividing the two fuel chambers. The float at a low level seats onto the upper end stop of the tube 49, and at a normal high level, as indicated at 41', seats upwards against the top of the float chamber. The filter unit could be omitted, in which case the fuel would be fed directly into the float chamber as at 51.

The float is secured directly to the piston 52 of a piston valve 53 which has a port 54 connected to the engine pressure lube oil, e.g. to the engine oil pump, a port 55 connected to the pipe connection 2 of the stopping device, and an exhaust port 56 connected to the engine oil sump. A by-pass 57 leads from the upper end of the piston chamber back to the port 56 to the sump, the upper end of the piston chamber being closed by a screw cap 58.

When the supply of fuel is adequate, the float will be at its normal high level as in FIG. 7, positioning the valve piston to put port 54 into communication with port 55, so that the engine oil pressure actuates the starting device to hold the engine control disc in its engine running position. When fuel falls low in the float chamber, the float will fall to the low level as in FIG. 8, positioning the valve piston to cut-off the engine oil pressure from the starting device and put same through the port 55 into communication with the port 56 to the engine oil sump. In the stopping device, the spring 9 then acts to release the first trigger 15 from the disc which is thence moved by the spring 30 to stop the engine, prior to the fuel supply being exhausted to prevent air bubbles entering the fuel injection system and avoid any need for repriming of the system.

Another sensing means may be in the form of a temperature sensitive unit arranged to operate said piston valve to stop the engine upon sensing an unduly high engine temperature, e.g. of the cylinder head or block or of an engine coolant or the engine oil. Thus referring to FIG. 9, a temperature sensitive unit 60 comprises a body 61 machined flat at 62 for fixing against the engine cylinder head or block 63. A temperature sensitive bellows 64 or equivalent means acts in the body against a closed end thereof to reciprocate a first rod 65 screw-threaded into an end piece 64' of the bellows and extending axially through an end cap 66 screw-threaded into the body for adjustment of a coil compression spring 67 acting between the cap and said end piece. The outer end of the rod 65 actuates via a screw-threaded end cap and pivotal connection 68, a lever 69 pivotally mounted at 70 on a bracket 71 extending from the body. The lever 69 in turn actuates via a screw-threaded end cap and pivotal connection 72 a second rod 73 which is reciprocable axially through a bored cap 74 of the piston valve 53, the bored cap 74 being an alternative to the closed cap 58 above described. In the case of excessive temperature, the rod 73 acts against the upper end of the valve piston 52 to depress same, against the upthrust of the float, to stop the engine as explained.

By way of example of the compact actual sizes involved, the disc of the stopping device may be of 3¼ ins. diameter, the overall height of the combined float unit and piston valve may be 6½ ins. (i.e. exclusive of the filter unit) and the length of the temperature sensitive unit body may be 3 ins.

We claim:

1. Engine control for internal combustion engines of the fuel injection type to stop the engine prior to exhaustion of fuel from the fuel injection system, said engine having a fuel injection pump provided with a control rod controlling the supply of fuel to be injected, a control member connected to said control rod, and a pressure lubricating oil circuit, said engine control comprising sensing means inserted in the fuel supply upstream of the injection pump and sensing drop of fuel below a predetermined level;

a servo system in the engine lubricating oil circuit having a control valve and a power output means operated by engine lubricating oil pressure, said servo system being connected to the control member to operate said member to assume, upon absence of oil pressure, a "stop" position;

said sensing means being connected to said control valve to operate said control valve to control said servo power output means to assume a position corresponding to the position assumed thereby upon failure of oil pressure;

whereby said engine control member will control the fuel injection pump to stop upon (a) drop of fuel below said predetermined level or (b) failure of lubricating oil pressure.

2. Apparatus according to claim 1 wherein the sensing means comprises a float unit in the fuel supply of a fuel injection engine upstream of the injector pump, the float unit being connected to the servo control valve to stop the engine prior to the fuel supply being exhausted to prevent air entering the fuel injection system.

3. Apparatus according to claim 2 wherein the servo control valve comprises a piston valve and the float acts directly on the valve piston normally at a high level to maintain the engine oil pressure lubricating circuit in communication with the power output means, but at a low level to cut off the actuating pressure to the power output means and connect said pressure lubricating circuit to the engine oil sump.

4. Apparatus according to claim 1 further including a temperature sensitive unit located to operate the servo control valve, upon sensing an unduly high temperature of at least a portion of the engine or engine fluid, to move said control valve to control said servo power output means to assume a position corresponding to the position assumed thereby upon failure of oil pressure.

5. Apparatus according to claim 3 further including a temperature sensitive unit having a movable element moving upon sensing an unduly high temperature of at least a portion of the engine or engine fluid; said servo control valve having a valve piston; said float acting on one end of the valve piston and the movable element of the temperature sensitive unit acting against the other end of said valve piston.

6. Apparatus according to claim 1 wherein the stopping device comprises a piston means displaced under the normal running engine oil actuating pressure, and a spring means applying a spring force against said piston means to lock an engine control rod in engine running position, the spring force acting on the piston means upon the fall in said actuation pressure to release said control member for automatic movement to a position to stop the engine.

7. Apparatus according to claim 6 wherein the piston means actuates a first trigger to lock or release said control member, a second trigger is spring urged to lock said control member in engine running position upon resetting same for starting or restarting the engine, and upon actuation of the first trigger due to engine oil actuating pressure upon starting the engine the first trigger operates to disengage the second trigger from the control member and simultaneously re-engages the control member to hold same locked in the engine running position.

8. Apparatus according to claim 7 wherein the control member is in the form of a rotatably mounted disc and said triggers co-operate with a slot of the disc in the engine running locked position of the disc.

9. Apparatus according to claim 7 wherein the control member is in the form of a reciprocable rod and said triggers co-operate with stop means on the rod in the engine running locked position of the rod.

10. Apparatus according to claim 6 wherein the control member is resettable from the engine stopping position to the engine running locked position manually upon starting or restarting the engine.

11. Apparatus according to claim 6 wherein the control member is resettable from the engine stopping position to the engine running locked position automatically upon starting or restarting the engine.

12. Apparatus according to claim 2 wherein the float unit comprises a float located in a fuel float chamber surmounting and downstream of a fuel filter unit.

References Cited

UNITED STATES PATENTS

| 1,740,259 | 12/1929 | Morrison | 123—41.15 |
| 2,096,291 | 10/1937 | Tanner | 123—198 |
| 3,153,403 | 10/1964 | Dobbs | 123—198 |
| 3,174,468 | 3/1965 | Newsom | 123—198 |
| 3,202,143 | 8/1965 | Goodwin | 123—41.15 |

FOREIGN PATENTS

| 1,013,121 | 8/1957 | Germany. |

WENDELL E. BURNS, *Primary Examiner.*